(12) United States Patent
Kubota et al.

(10) Patent No.: US 10,401,944 B2
(45) Date of Patent: Sep. 3, 2019

(54) POWER CONTROL DURING RELEASING OPERATION

(71) Applicant: FUJITSU CLIENT COMPUTING LIMITED, Kawasaki-shi, Kanagawa (JP)

(72) Inventors: Toru Kubota, Kawasaki (JP); Taketoshi Hayashi, Nagoya (JP)

(73) Assignee: Fujitsu Client Computing Limited (JP)

( * ) Notice: Subject to any disclaimer, the term of this patent is extended or adjusted under 35 U.S.C. 154(b) by 148 days.

(21) Appl. No.: 15/624,286

(22) Filed: Jun. 15, 2017

(65) Prior Publication Data
US 2018/0024616 A1 Jan. 25, 2018

(30) Foreign Application Priority Data
Jul. 22, 2016 (JP) .................. 2016-144250

(51) Int. Cl.
*G06F 1/32* (2019.01)
*G06F 1/16* (2006.01)
*G06F 1/3287* (2019.01)
*G06F 1/3215* (2019.01)
*G06F 1/26* (2006.01)

(52) U.S. Cl.
CPC .......... *G06F 1/3287* (2013.01); *G06F 1/1626* (2013.01); *G06F 1/1632* (2013.01); *G06F 1/26* (2013.01); *G06F 1/3215* (2013.01)

(58) Field of Classification Search
None
See application file for complete search history.

(56) References Cited

U.S. PATENT DOCUMENTS 5,598,537 A * 1/1997 Swanstrom ........... G06F 1/1632
361/679.4
5,598,539 A * 1/1997 Gephardt .............. G06F 1/1632
710/304

(Continued)

FOREIGN PATENT DOCUMENTS

JP 6-161611 6/1994
JP 2002-218300 8/2002

(Continued)

OTHER PUBLICATIONS

RD602065A, Jun. 2014, RD, Hewlett Packard.*

*Primary Examiner* — Steven G Snyder
(74) *Attorney, Agent, or Firm* — Harness, Dickey & Pierce, P.L.C.

(57) ABSTRACT

An information processing device includes a plate on which a hook is provided and configured to move between a first position where a connection with another information processing device by the hook is done and a second position where the connection by the hook is released; and a processor configured to energize the another information processing device via a connection terminal when the connection is maintained by the hook, receive information indicating that a releasing operation for releasing the connection is started before the connection is released when a position of the plate is moved, and cut off the energization to the another information processing device via the connection terminal according to the reception.

8 Claims, 14 Drawing Sheets

(56) References Cited

U.S. PATENT DOCUMENTS

| | | | | |
|---|---|---|---|---|
| 5,664,118 A * | 9/1997 | Nishigaki | G06F 1/1632 | 710/304 |
| 5,668,977 A * | 9/1997 | Swanstrom | G06F 1/1632 | 703/23 |
| 5,862,393 A * | 1/1999 | Davis | G06F 1/3215 | 710/302 |
| 5,889,964 A * | 3/1999 | Cho | G06F 1/1632 | 710/304 |
| 6,778,382 B2 * | 8/2004 | Yim | G06F 1/1616 | 345/82 |
| 6,944,012 B2 * | 9/2005 | Doczy | G06F 1/1626 | 312/208.1 |
| 6,944,017 B2 * | 9/2005 | Dai | G06F 1/1626 | 361/679.29 |
| 7,265,739 B2 * | 9/2007 | Yim | G06F 1/1616 | 345/76 |
| 7,355,845 B2 * | 4/2008 | Kim | B60R 11/0258 | 361/679.33 |
| 7,380,143 B2 * | 5/2008 | Gold | G06F 1/1632 | 361/679.41 |
| 7,599,178 B2 * | 10/2009 | Huang | G06F 1/1632 | 361/679.28 |
| 9,047,049 B2 * | 6/2015 | Yang | G06F 1/1626 | |
| 9,690,332 B2 * | 6/2017 | Liu | G06F 1/1681 | |
| 9,870,027 B2 * | 1/2018 | Wang | G06F 1/1632 | |
| 2001/0048587 A1 * | 12/2001 | Yim | G06F 1/1616 | 361/679.21 |
| 2002/0085348 A1 * | 7/2002 | Dai | G06F 1/1626 | 361/679.29 |
| 2002/0093583 A1 * | 7/2002 | Ito | H04N 1/00236 | 348/373 |
| 2004/0250144 A1 * | 12/2004 | Lee | E05C 1/10 | 713/320 |
| 2007/0043959 A1 * | 2/2007 | Gold | G06F 1/1632 | 713/300 |
| 2008/0002348 A1 * | 1/2008 | Kim | B60R 11/0258 | 361/679.33 |
| 2009/0167539 A1 * | 7/2009 | Motoe | G06F 1/1632 | 340/600 |
| 2010/0037072 A1 * | 2/2010 | Nejah | G06F 1/1632 | 713/310 |
| 2010/0181450 A1 * | 7/2010 | Hulick | G06F 1/1626 | 248/229.2 |
| 2013/0155583 A1 * | 6/2013 | Yang | G06F 1/1626 | 361/679.01 |
| 2014/0193193 A1 * | 7/2014 | Wikander | G06F 1/1616 | 403/322.1 |
| 2015/0098182 A1 * | 4/2015 | Liu | G06F 1/1681 | 361/679.55 |
| 2015/0160700 A1 * | 6/2015 | Yang | G06F 1/1669 | 361/679.17 |
| 2015/0198980 A1 * | 7/2015 | Aoki | G06F 1/1616 | 361/679.17 |
| 2016/0077549 A1 * | 3/2016 | Wang | G06F 1/1632 | 710/304 |

FOREIGN PATENT DOCUMENTS

| | | |
|---|---|---|
| JP | 2009-157877 | 7/2009 |
| JP | 2015125468 A * | 7/2015 |

* cited by examiner

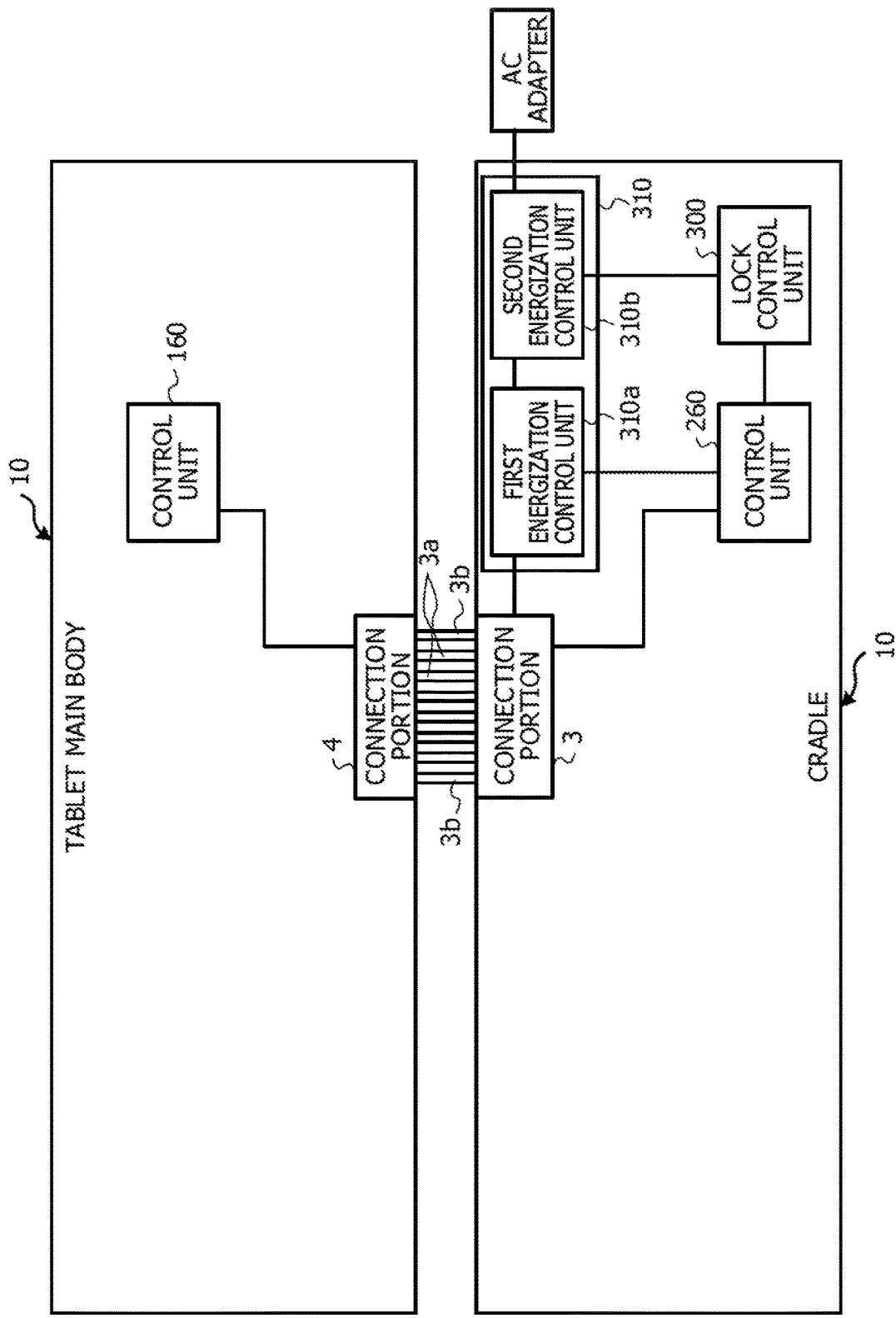

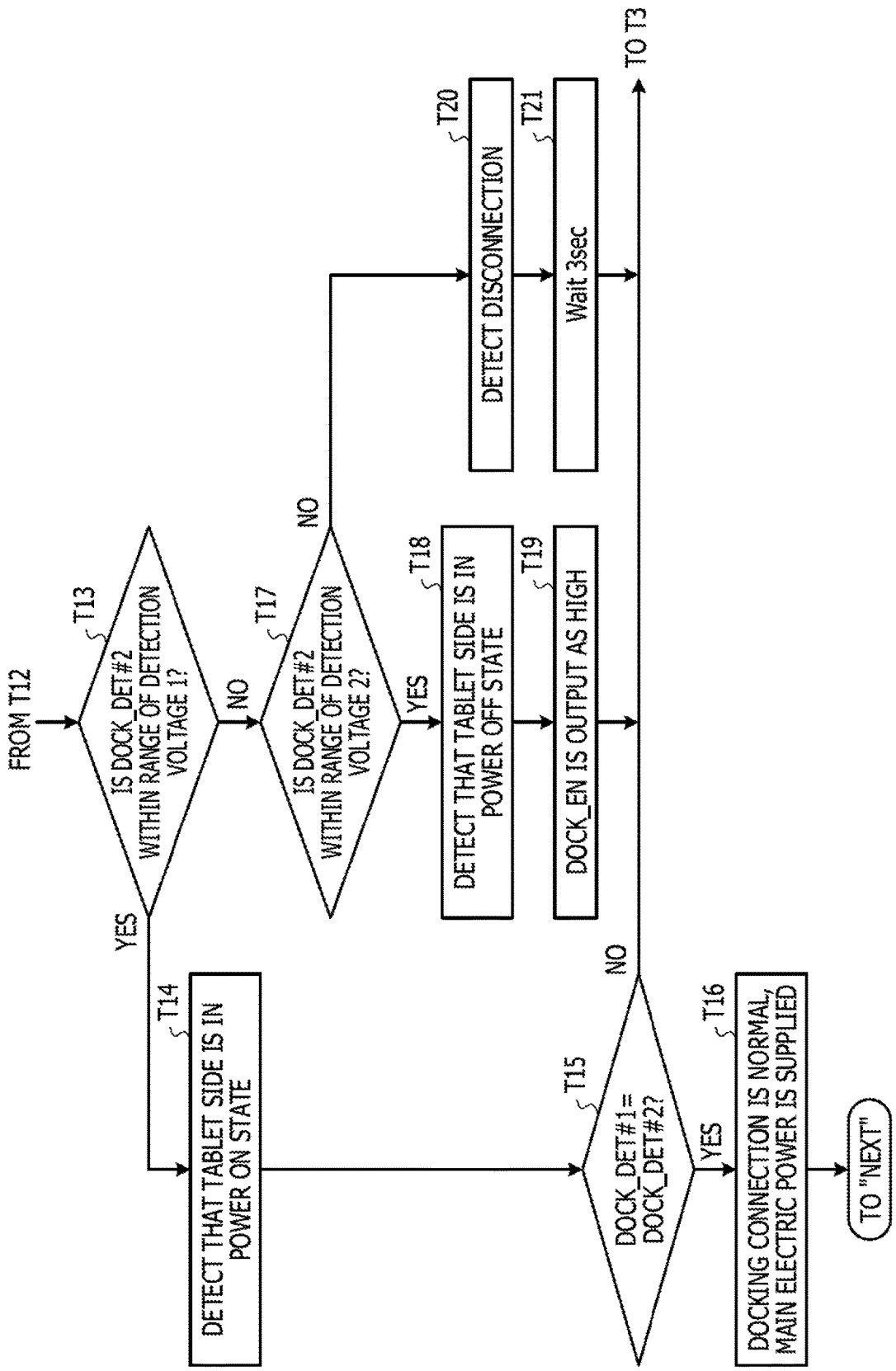

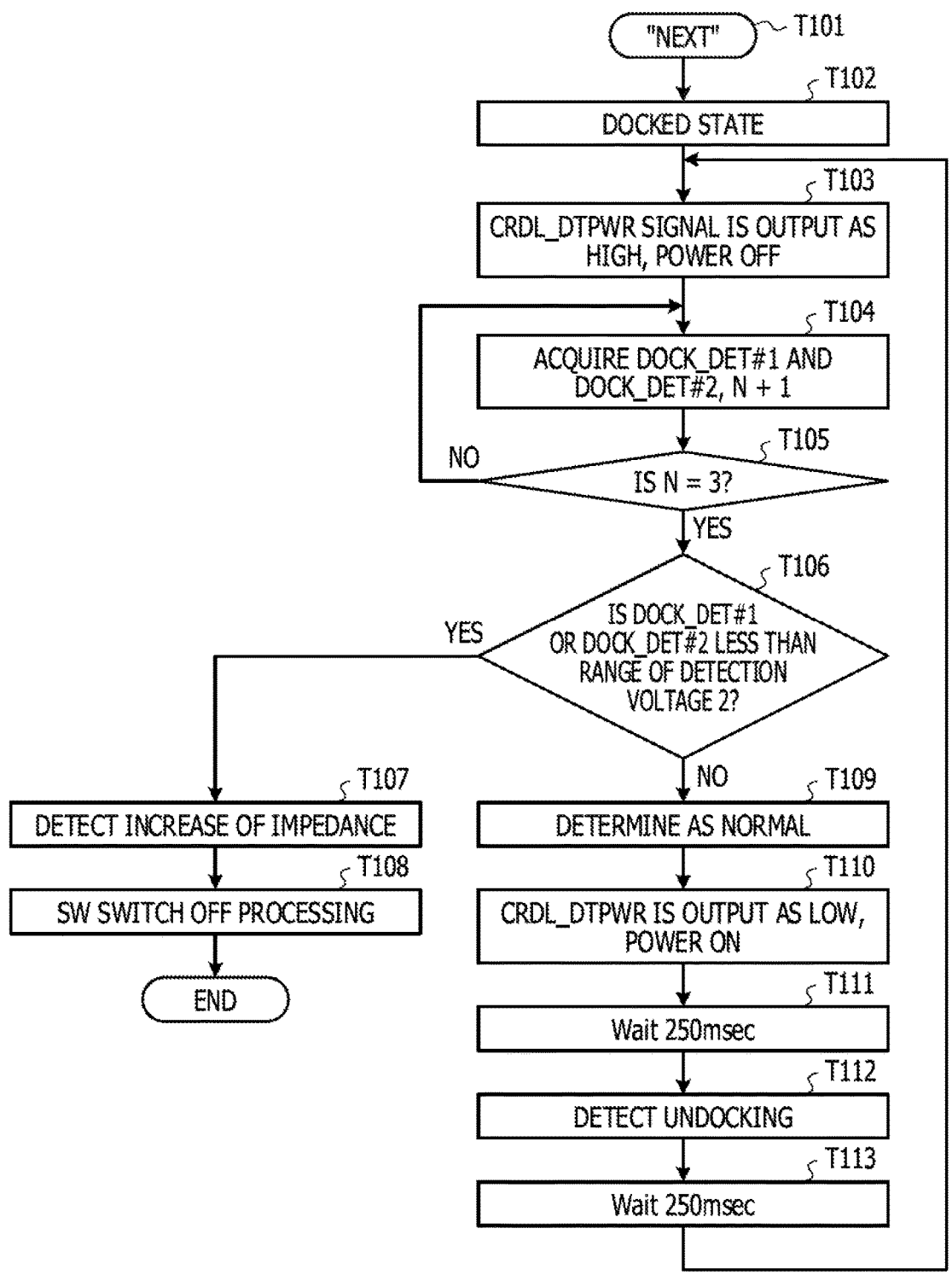

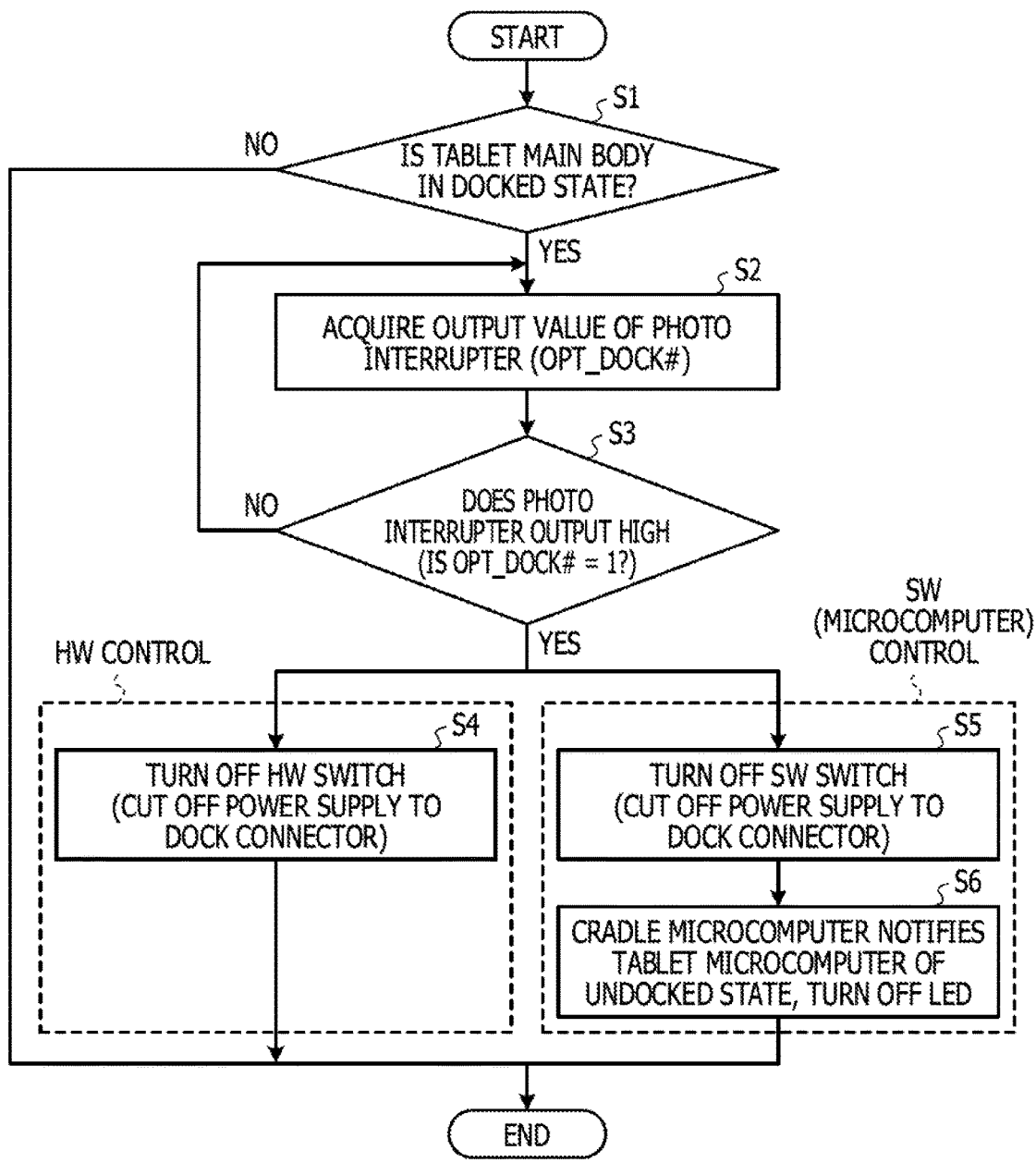

POWER CONTROL DURING RELEASING OPERATION

CROSS-REFERENCE TO RELATED APPLICATION

This application is based upon and claims the benefit of priority of the prior Japanese Patent Application No. 2016-144250, filed on Jul. 22, 2016, the entire contents of which are incorporated herein by reference.

FIELD

The embodiment discussed herein is related to an information processing device, a control method, and a storage medium.

BACKGROUND

Recent years, a tablet type terminal device becomes compact and thin so as to be easily carried by a user. The compact and thin terminal device may not have an expanded function such as an external interface. In this terminal device, the terminal device is connected to an expansion device such as a cradle or a docking station having expanded functions, and then, the functions of the expansion device are used.

The terminal device and the expansion device can communicate with each other by making the connection terminals of both terminals come in electrically contact with each other at the time of connection. If the connection terminals are energized when disconnecting the terminal devices from the expansion device, in some cases, the connection terminals may deteriorate due to an occurrence of a spark between the two terminals. Therefore, for example, a technology is known, in which a magnetic sensor is provided in the terminal device, and the magnetic sensor detects a magnetic field using a magnet attached to the expansion device, and a power supply to the connection terminals is cut off according to the change of the magnetic field (for example, refer to Japanese Laid-open Patent Publication No. 2009-157877). As another related art, for example, Japanese Laid-open Patent Publication No. 6-161611 is disclosed.

However, in the Patent Literatures described above, in order to detect the change of the magnetic field, the terminal device is desired to be removed. Therefore, it is not possible to realize the cutoff of the power supply before removing the terminal device. In this case, a spark occurs when removing the terminal device from the expansion device, and thus, the connection terminal may deteriorate.

SUMMARY

According to an aspect of the invention, an information processing device includes a plate on which a hook is provided and configured to move between a first position where a connection with another information processing device by the hook is done and a second position where the connection by the hook is released; and a processor configured to energize the another information processing device via a connection terminal when the connection is maintained by the hook, receive information indicating that a releasing operation for releasing the connection is started before the connection is released when a position of the plate is moved, and cut off the energization to the another information processing device via the connection terminal according to the reception.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a functional configuration of the tablet main body and the cradle in the embodiment;

FIGS. 7A and 7B are flowcharts illustrating an example of determination processing in the embodiment;

FIG. 8 is a flowchart illustrating an example of the determination processing (continuation of FIGS. 7A and 7B) in the embodiment;

FIG. 9 is a flowchart illustrating an example of undocking processing in the embodiment;

DESCRIPTION OF EMBODIMENT

Hereinafter, an embodiment of the present disclosure will be described referring to the attached drawings. In the present specification and the drawings, the same signs will be given to the configuration elements actually having the same functional configurations, and the description thereof will be omitted.

Recent years, a tablet type terminal device becomes compact and thin so as to be easily carried by a user. Therefore, in some cases, an expanded function such as an external interface is not incorporated in the tablet main body. In the tablet main body, the terminal device is connected to an expansion device such as a cradle or a docking station having expanded functions, and then, the functions of the expansion device are used. Methods of connecting the tablet main body and the cradle are, for example, a connector connection, a wired connection, and a wireless connection. Hereinafter, a system will be described, in which the method of connecting the tablet main body and the cradle is the connector connection.

An example of a system capable of connecting (docking) the tablet main body and the cradle in the present embodiment will be described referring to FIG. 1A, FIG. 1B, FIG. 1C and FIG. 1D. In this system, a tablet main body 10 can use a power supply function or an expanded function of a cradle 20 by docking the tablet main body 10 into the cradle 20 which is a stand.

Figure 1A:
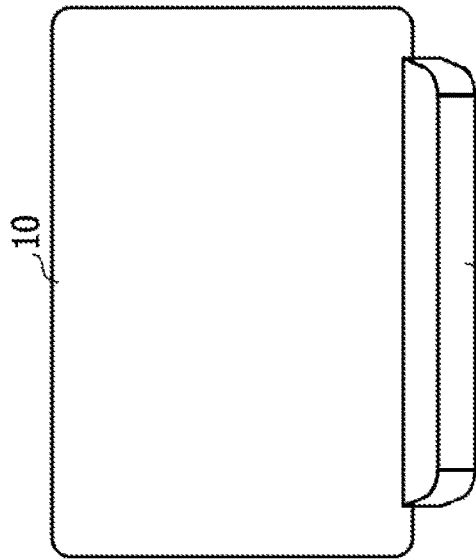
FIGS. 1A to 1D are diagrams illustrating an example of a system of a tablet main body and a cradle in an embodiment.
Figure 1C:
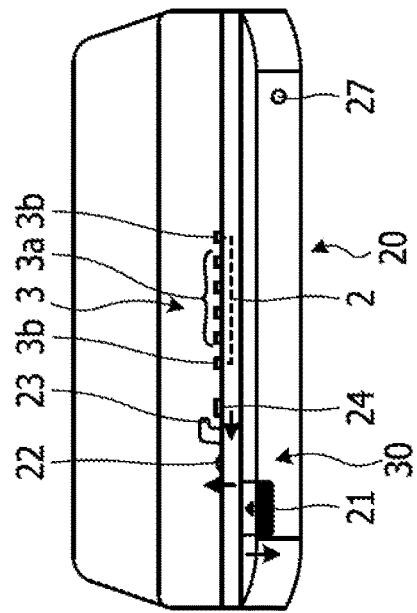
Figure 1B:
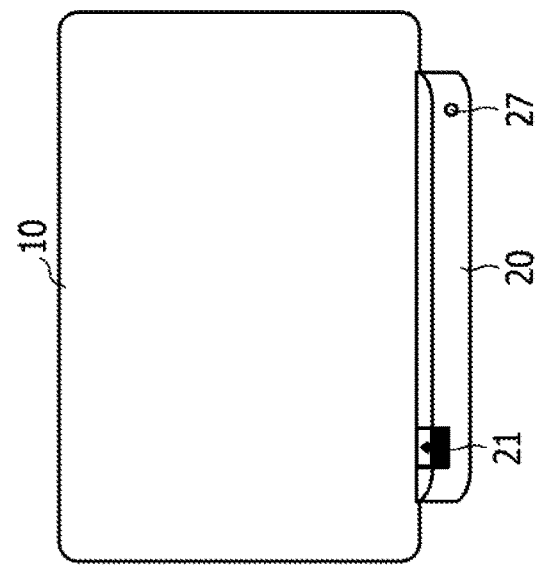

FIG. 1A is a front view illustrating a state in which the tablet main body 10 is docked into the cradle 20, and FIG. 1B is a rear view thereof. When a user pushes an eject button 21 provided on the cradle 20, the tablet main body 10 can be disconnected from the cradle 20. When the tablet main body 10 and the cradle 20 are correctly connected, an LED 27 is turned on. When the tablet main body 10 is disconnected from the cradle 20, the LED 27 is turned off.

Figure 1D:
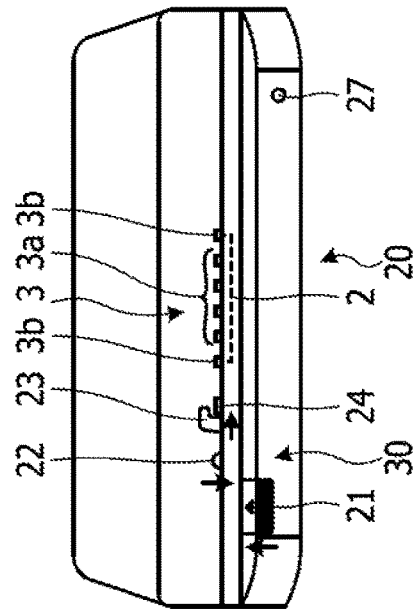

FIG. 1C illustrates a state of the cradle 20 when the tablet main body 10 is docked into the cradle 20, and FIG. 1D illustrates a state of the cradle 20 when the tablet main body 10 is disconnected from the cradle 20. A lock mechanism 30 including the eject button 21, a mechanical switch 22, a hook 23, and a photo interrupter 24 is included in the cradle 20, and each of the above mechanism elements is designed to move in conjunction with each other. For the convenience in description, the tablet main body 10 is not illustrated in FIG. 1C and FIG. 1D.

When the tablet main body 10 is close to the cradle 20 for the connection, as illustrated by an arrow in FIG. 1C, at first, the mechanical switch 22 is pressed by the tablet main body 10. When the mechanical switch 22 is pressed, the hook 23 slides in the right direction in the drawing and the tablet main body 10 installed on the cradle 20 is engaged in a groove, and then, the connection portion can be locked. At the same time, the eject button 21 returns to the original state.

On the other hand, when disconnecting the tablet main body 10 from the cradle 20, as illustrated by an arrow in FIG. 1D, the eject button 21 is pressed and the hook 23 slides in the left direction, and then the lock is released. At the same time, the mechanical switch 22 returns to the original state. In this state, if the tablet main body 10 is lifted, the tablet main body 10 can be removed from the cradle 20. In the present embodiment, connection terminals 3a and 3b provided at the cradle 20 side are plugged into contact points at the connection portions at the tablet main body 10 side, and then, the cradle 20 and the tablet main body 10 are electrically connected to each other. However, the configuration of the connection portions is not limited thereto. The connection terminals may be provided at the tablet main body 10 side and the contact points into which the connection terminals are plugged may be provided at the cradle 20 side. A dock connector 2 at the cradle 20 side and the connection terminals 3a and 3b are collectively referred to as a connection portion 3. The connection terminals 3b at both ends, the other connection terminal 3a, and the dock connector 2 at the cradle 20 side are collectively referred to as the connection portion 3.

The dock connector 2 at the cradle 20 side is connected to a dock connector at the tablet main body 10 side at the time of docking. A problem in the connector connection of the cradle described above includes the deterioration of the connection terminals. For example, as disclosed in International Publication Pamphlet No. WO2016/031073, a technology is known, in which the dock connector is energized only after checking that the tablet main body and the cradle are in a reliably connected state (hereinafter, referred to as "docked state"). In this technology, voltages of the connection terminals at both ends of the dock connector are monitored by a microcomputer. The microcomputer performs processing for energizing the connector when the voltages are in the normal ranges. By using this technology, there is an advantage in which, in a case where the tablet main body is diagonally connected, it is possible to avoid a heat generation burnout of the connection terminal. At the time docking, since the connection terminal is not energized, it is possible avoid the spark between the two terminals.

However, in this technology, when removing the tablet main body from the cradle (hereinafter, referred to as "undock"), the tablet main body is removed from the cradle in a state in which the connection terminal is energized. That is because the tablet main body or the microcomputer mounted on the cradle is not able to detect the undocked state before the physical removing. Therefore, there is a possibility that the spark may occur between the connection terminals of the connector when removing. There is a concern that the deterioration of the connection terminals may be accelerated due to a load being applied to the connection terminals.

In this technology, there is no way for the user to easily know whether or not the cradle only is in the docked state without activating the tablet main body. For example, even though the user thinks that the cradle is docked, when the cradle is not in a complete docked state or the connection terminals are in a state of incomplete docking in a case of a contact failure or in a case where the lock mechanism is in a half-locked state or the like, it is difficult for the user to notice that the cradle is not completely docked.

Therefore, in order to check the docked state, the user has to activate the tablet main body and check the docked state using an application on the operating system (OS). Particularly, in a case where the user uses the system in a state in which the hook of the cradle is not completely locked despite that the dock connectors of the tablet main body and the cradle are in contact with each other, the user does not notice that the lock of the cradle is not completely locked. In this case, if the user slightly moves the tablet main body or the cradle, the tablet main body will be separated from the cradle. Therefore, there is a concern that the connection may be interrupted while accessing the storage such as a hard disk drive (HDD) or a universal serial bus (USB) memory.

Therefore, the present embodiment provides a system capable of avoiding a damage occurring by energizing the dock connector when disconnecting the connection between the tablet main body 10 and the cradle 20. In order for this, in the present embodiment, the photo interrupter 24 is mounted on a substrate of the cradle 20. The output of the photo interrupter 24 changes in accordance with the pressing of the mechanical switch 22 and the pressing of the eject button.

Figure 2A:
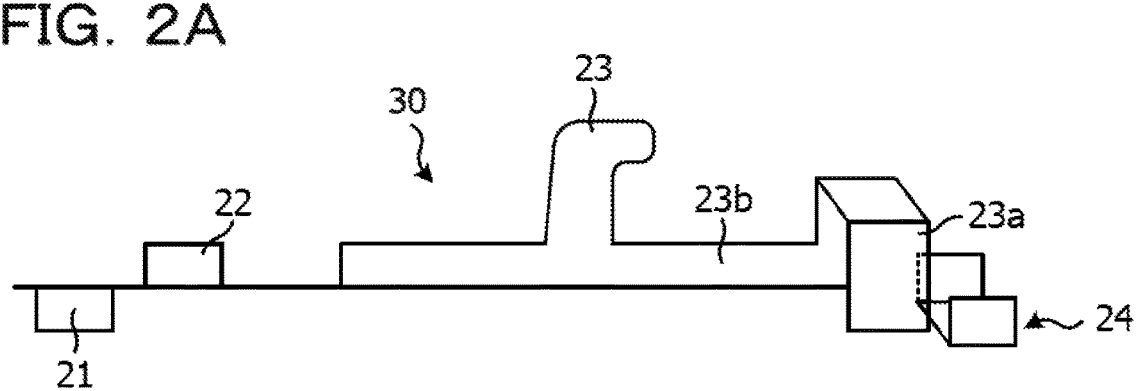
FIGS. 2A to 2C are diagrams schematically illustrating an example of an operation of a lock mechanism in the embodiment.
Figure 2B:
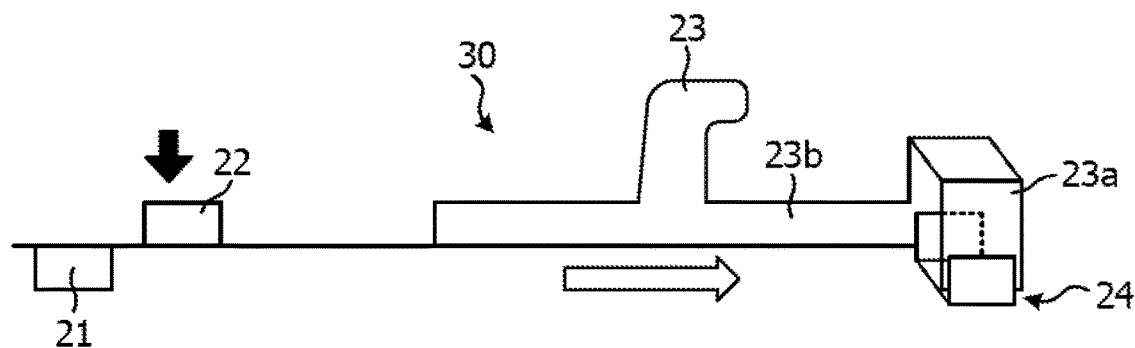
Figure 2C:
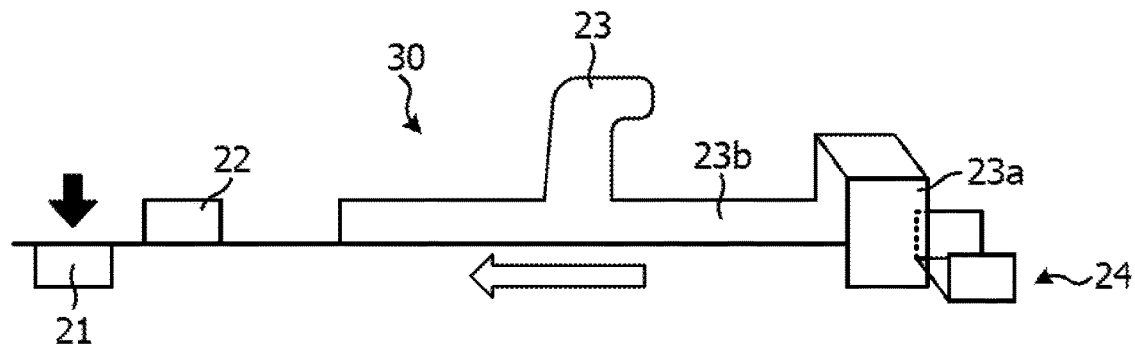
Figure 3:
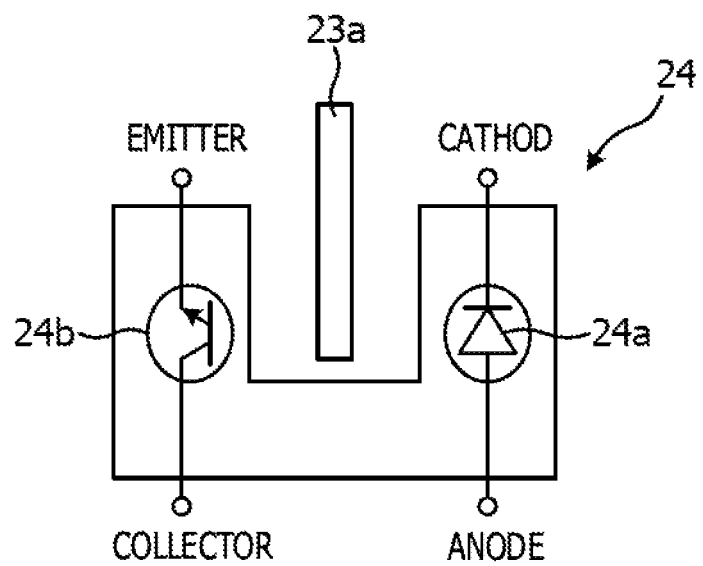
FIG. 3 is a diagram illustrating an example of an internal configuration of a photo interrupter in the embodiment.

An example of an operation of the lock mechanism 30 inside the cradle 20 is illustrated in FIG. 2A, FIG. 2B, and FIG. 2C. An example of an internal configuration of the photo interrupter 24 is illustrated in FIG. 3. The lock mechanism 30 has a structure in which a metal plate 23b slides in synchronization with the movement of the hook 23. Specifically, at an initial position illustrated in FIG. 2A, the mechanical switch 22 is pressed. Then, as illustrated in FIG. 2B, the metal plate 23b moves to the right direction in the drawing together with the hook 23. A light shielding plate 23a at a distal end portion of the metal plate 23b moves to a light shielding position in the photo interrupter 24. On the other hand, when the eject button 21 is pressed, as illustrated in FIG. 2C, the metal plate 23b moves to the left direction in the drawing together with the hook 23. Then, the light shielding plate 23a at the distal end portion of the metal plate 23b retreats from the light shielding position in the photo interrupter 24.

As illustrated in FIG. 3, the photo interrupter 24 used in the present embodiment is transmission type. A circuit inside the photo interrupter 24 includes an LED 24a and a phototransistor 24b. The light shielding plate 23a shields the light from the LED 24a. Not limited to the light shielding plate 23a, any material that can shield the light from the LED 24a can be used instead of the light shielding plate 23a.

In a case where there is a light shielding plate 23a, the light emitted from the LED 24a is not incident on a base of the phototransistor 24b, and thus, the phototransistor 24b is turned OFF. On the other hand, in a case where there is no light shielding plate 23a, the light emitted from the LED 24a is incident on a base of the phototransistor 24b, and the phototransistor 24b is turned ON.

In the present embodiment, the energization to the connection terminals 3a and 3b or the interruption on the energization is controlled using the change of the output between when the light shielding plate 23a shields the light to the photo interrupter 24 and when the light shielding plate 23a does not shield the light, in other words, when the hook is in the locked state and when the hook is not in the locked state in FIGS. 2A to 2C. The microcomputer at the tablet side is notified of cutoff of the power source at the same time of the interruption on the energization. In this way, the deterioration of the connection terminal occurring by energizing the dock connector can be avoided.

Figure 4A:
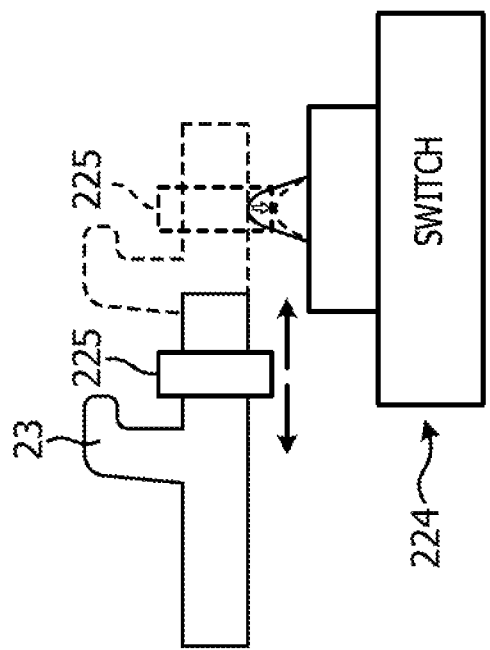
FIGS. 4A and 4B are diagrams illustrating an example of an alternative configuration of the photo interrupter in the embodiment.
Figure 4B:
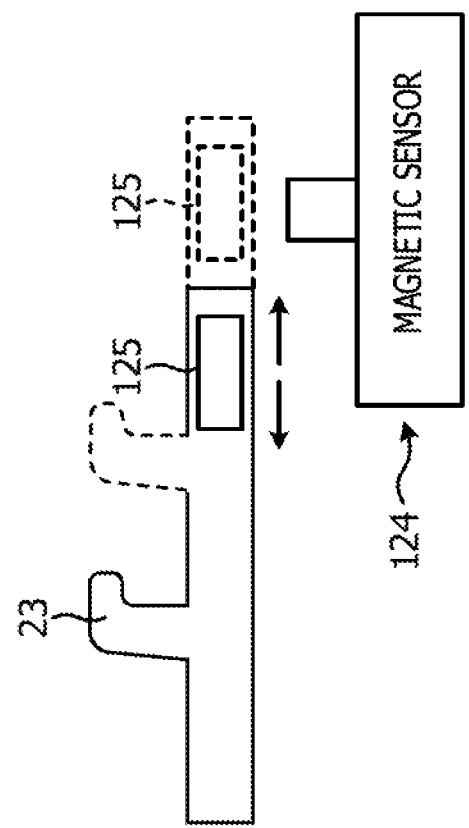

In the present embodiment, due to a structural restriction and in order to improve the position accuracy of the hook 23, the photo interrupter 24 is used as an example. However, in a structure in which the sliding width of the hook 23 is large, a magnetic sensor or a mechanical switch can be used instead of the photo interrupter 24, or the above-described structure can be used together with the photo interrupter 24. An example of the configuration using the magnetic sensor 124 and a magnet 125 is illustrated in FIG. 4A and an example of the configuration using the mechanical switch 224 and a structure 225 is illustrated in FIG. 4B. In any cases, the magnet 125 and the structure 225 slide in synchronization with the sliding of the hook 23.

In FIG. 4A, a magnitude of the magnetic field detected by the magnetic sensor 124 changes due to the movement of the magnet 125. When the magnitude of the magnetic field detected by the magnetic sensor 124 is larger than a predetermined value, it is determined that the state is docked state, and in other cases, it is determined that the state is undocked state. In this way, it is possible to determine whether the state is docked state or undocked state.

In FIG. 4B, the mechanical switch 224 is turned ON or turned OFF according to the movement of the structure 225. When the mechanical switch 224 is turned ON, it is determined that the state is docked state, and when the mechanical switch 224 is turned OFF, it is determined that the state is undocked state. In this way, it is possible to determine whether the state is docked state or undocked state.

According to such a configuration, the cradle 20 includes a mechanical switch 22 that makes the switch ON when the tablet main body 10 is docked, and the hook 23 that makes the switch locked. The cradle 20 includes the metal plate 23b that slides in synchronization with the hook 23 and the eject button 21 for releasing the lock. A socket for the hook 23 is formed on the tablet main body 10. The tablet main body 10 has a structure in which the tablet main body 10 can be locked when the tablet main body 10 is placed on the cradle 20.

In a case of removing the tablet main body 10 from the state in which the tablet main body 10 and the cradle 20 are docked, the user presses the eject button 21. In this way, the metal plate 23b slides (unlock) in synchronization with the sliding of the hook 23 locking the tablet main body 10. The light is detected from the photo interrupter 24 and the output of the photo interrupter 24 changes according to the light. The output of the photo interrupter 24 is detected by a hardware switch (hereinafter, referred to as a "HW switch") or a cradle microcomputer. The power supply to the connection terminals 3a and 3b is stopped by the hardware control (hereinafter, referred to as "HW control") that switches the HW switch OFF. The cradle microcomputer notifies a tablet microcomputer of the undocked state.

In an undocking procedure, it is possible to remove the tablet main body 10 from the cradle 20 in a state in which the power is not supplied to the connection terminal by the above-described HW control and the application operation by the microcomputer (hereinafter, referred to as a "SW control"). In this way, it is possible to avoid the deterioration of the connection terminal occurring by energizing the dock connector. Hardware configurations and functional configurations of the tablet main body 10 and the cradle 20 in the present embodiment will be described below, and then, the procedure of the undocking processing described above will be described in detail.

Figure 5:
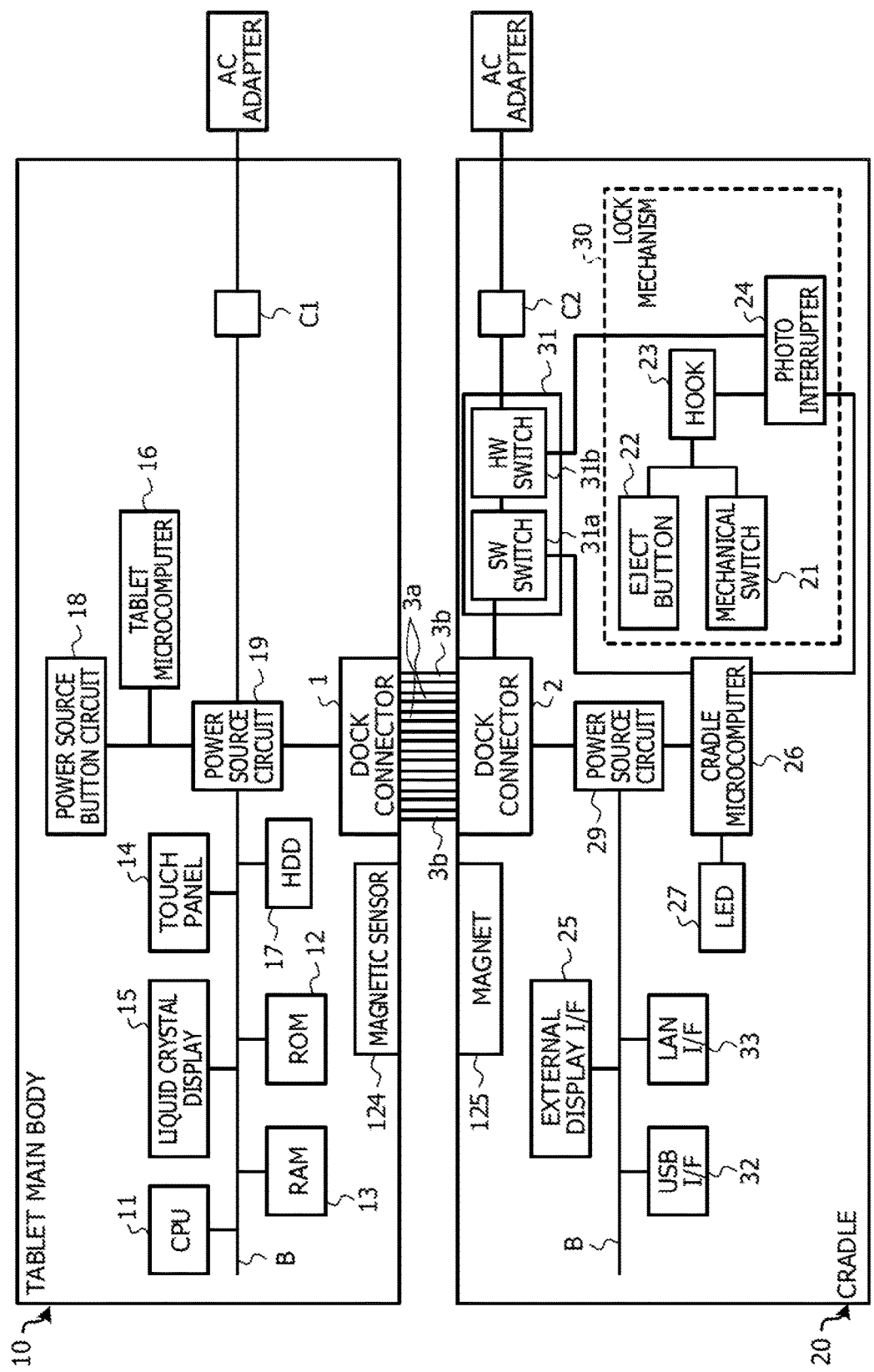
FIG. 5 is a diagram illustrating an example of a hardware configuration of the tablet main body and the cradle in the embodiment.

An example of the hardware configurations of the tablet main body 10 and the cradle 20 in the present embodiment will be described referring to FIG. 5.

The tablet main body 10 is not limited to a tablet type terminal, but may be an information processing device such as a personal computer (PC), a smart phone, a video camera, a digital camera, a personal digital assistants (PDA), a mobile phone, a portable music reproducing device, a portable video processing device, a portable game device, or a wearable display device such as a head mount display (HMD).

The cradle 20 may be an expansion device having an expanded function such as an external interface and expands the function of the tablet main body 10. However, the cradle 20 is not limited to the expansion device, but may be a terminal device connectable to the tablet main body 10.

The tablet main body 10 includes a central processing unit (CPU) 11, a read only memory (ROM) 12, a random access memory (RAM) 13, a touch panel 14, a liquid crystal display 15, a tablet microcomputer 16, a hard disk drive (HDD) 17, a magnetic (magneto resistive (MR)) sensor 124, a power source button circuit 18, a power source circuit 19, an AC connector C1 and a dock connector 1. The CPU 11, the ROM 12, the RAM 13, the touch panel 14, the liquid crystal display 15, the tablet microcomputer 16, the HDD 17, the power source button circuit 18, the power source circuit 19, and the dock connector 1 are connected to each other by a connection bus B. The magnetic sensor 124 is connected to the tablet microcomputer 16.

The CPU 11 writes a predetermined program in a work area in the RAM 13 from the HDD 17 in which various programs and various data items are stored, and causes the program to be executed and performs the control of the tablet main body 10.

The HDD 17 stores various programs and data items recording medium in a in a readable and writable manner. The operating system (OS) or the like is stored in the HDD 17. Instead of the HDD 17, for example, the above-described programs and data items may be stored in a storage device in a client system that is a group of computers on a network. Instead of the HDD 17, for example, an erasable programmable ROM (EPROM) or a solid state drive (SSD) can be used. For example, a compact disc (CD) drive device, a digital versatile disc (DVD) drive device, a Blu-ray (registered trademark) disc (BD) drive device can be used. A network attached storage (NAS) or a storage area network (SAN) may be used.

The touch panel 14 receives a touch operation by the user. A method of detecting the touch by the touch panel 14 may be any method as long as the touch operation by the user can be detected. In the method of detecting the touch by the touch panel 14, for example, a matrix switch method, a resistive film method, a surface acoustic wave method, or an electrostatic capacity method are included.

The data processed by the CPU 11 or the data items stored in the ROM 12 and the RAM 13 are output to the liquid crystal display 15. The liquid crystal display 15 is, for example, a liquid crystal display (LCD). The liquid crystal display 15 may be a plasma display panel (PDP), an electroluminescence (EL) panel, or an organic EL panel.

The tablet microcomputer 16 is a microcontroller. The tablet microcomputer 16 includes an arithmetic circuit that performs various arithmetic processing items based on various processing programs, and a storage device that stores the above-described various processing programs, various tables, or the like. The tablet microcomputer 16 determines the connection state between the tablet main body 10 and the cradle 20 by acquiring a voltage value between the connection terminals 3*b* at both ends illustrated in FIG. 5. The tablet microcomputer 16 can acquire the notification of information relating to the connection state by performing the communication with the cradle microcomputer 26 at the cradle 20 side via the dock connectors 1 and 2. The dock connectors 1 and 2 are examples of a connection portion that can connect one terminal device and another terminal device.

The magnetic sensor 124 is a sensor using a magnetoresistive element in which the electric resistance is changed by the magnetic field. The magnetic sensor 124 detects an approach of the tablet main body 10 and the cradle 20 by detecting the magnetic field from the magnet 125 provided on the cradle 20. The magnetic sensor 124 and the magnet 125 may not be provided.

The tablet main body 10 and the cradle 20 are in the communication enabled state by electrically connecting the dock connector 1 to the dock connector 2 of the cradle 20. A surface of the dock connector 1 is formed to be plane and includes a plurality of contact points to which a plurality of connection terminals 3*a* and 3*b* included in the dock connector 2 are connected. The connection terminals 3*a* and 3*b* are used for the communication between the tablet main body 10 and the cradle 20 or the power supply from one of the tablet main body 10 and the cradle 20 to the other.

The tablet microcomputer 16 acquires the voltage value at the connection terminal 3*b* of the cradle 20 side. The voltage applied to the connection terminal 3*b* is adjusted so as to be within certain ranges that are different from each other depending on a case where the power is supplied to the cradle microcomputer 26 and a case where the power is not supplied to the cradle microcomputer 26.

When the power source button provided on the tablet main body 10 is pressed, the fact that the power source button is turned ON is transferred to the tablet microcomputer 16 via the power source button circuit 18. Then, the power is supplied to each portion from an alternating current (AC) adapter connected to an alternating current (AC) connector C1 via the power source circuit 19. Besides the AC adapter, a battery may be connected to the AC connector C1 and the power may be supplied from the battery.

The cradle 20 includes an external display interface (I/F) 25, the cradle microcomputer 26, an LED 27, a USB interface (I/F) 32, a local area network (LAN) interface (I/F) 33, a power source circuit 29, a magnet 125, a lock mechanism 30, a switch mechanism 31, an AC connector C2, and a dock connector 2. The external display I/F 25, the USB I/F 32, the LAN I/F 33, the cradle microcomputer 26, the power source circuit 29, and the dock connector 2 are connected to each other via a connection bus B. The LED 27 is connected to the cradle microcomputer 26.

The external display I/F 25, the USB I/F 32, and the LAN I/F 33 are interfaces with external devices. The external devices connected to the external display I/F 25, the USB I/F 32, and the LAN I/F 33 can be used by the tablet main body 10 connected to the cradle 20.

The switch mechanism 31 is provided in a power source system that links the AC connector C2 connected to the AC adapter and the dock connector 2. The switch mechanism 31 includes a SW switch 31*a* and the HW switch 31*b*. The SW switch 31*a* is connected to the cradle microcomputer 26. The HW switch 31*b* is connected to the photo interrupter 24 in the lock mechanism 30. Besides the AC adapter, the battery may be connected to the AC connector C2 and the power may be supplied from the battery.

The dock connector 2 is connected to the dock connector 1 of the tablet main body 10, and thus, electrically connects the tablet main body 10 and the cradle 20, and thus, can enable both devices to exchange the communication and the power. The dock connector 2 of the cradle 20 includes a plurality of connection terminals 3*a* and 3*b* that correspond to a plurality of contact points in the dock connector 1. The connection terminals 3*a* and 3*b* are movable forward and backward in the vertical direction. The connection terminals 3*a* and 3*b* sink downward by being pressed due to a contact with the dock connector 1. On the other hand, when the connection to the dock connector 1 is open, the connection terminals 3*a* and 3*b* protrudes upward due to an urging force (restoring force) of a spring. The tablet main body 10 and the cradle 20 are electrically connected to each other by the connection terminals 3*a* and 3*b* being in contact with the contact point of the dock connector 1. The connection terminals 3*a* and 3*b* are used for the data communication and the exchange of the electric power through being in contact with the corresponding contact point of the dock connector 1. The voltage applied to connection terminals 3*b* at both end is adjusted so as to be within certain ranges of a detection voltage 1 and a detection voltage 2 that are different from each other depending on a case where the power is supplied to the tablet microcomputer 16 and a case where the electric power is not supplied to the tablet microcomputer 16.

The cradle microcomputer 26 is a microcontroller. The cradle microcomputer 26 includes an arithmetic circuit that performs arithmetic processing based on processing programs such as a docking and undocking processing program and a determination processing program executed at the time of docking and undocking, and a storage device that stores the processing program and various tables. The cradle microcomputer 26 determines the connection state between the tablet main body 10 and the cradle 20 by acquiring the voltage value applied to the connection terminal 3*b*. The cradle microcomputer 26 can acquire or notify of the information relating to the connection state by communicating with the tablet microcomputer 16 of the tablet main body 10 via the dock connector 2.

The switch mechanism 31 in the present embodiment is a mechanical switch. The switch mechanism 31 includes a two-stage switch having the SW switch 31*a* and the HW switch 31*b*. A LOW or HIGH signal is input to the HW switch 31*b* from the photo interrupter 24 according to the state of the photo interrupter 24 provided on the cradle 20. During the period when the signal input to the HW switch 31b from the photo interrupter 24 is LOW, the HW switch 31b and the SW switch 31a are turned ON. Then, the electric power is supplied to each portion from the AC adapter connected to the AC connector C1 via the power source circuit 29. When the signal input to the HW switch 31b from the photo interrupter 24 becomes HIGH, the HW switch 31b is turned OFF. Then, the power supply to the dock connector 2 is cut off. The relationship between HIGH and LOW may be reversed because the output of the photo interrupter 24 may be logically inverted in the external circuit.

The cradle microcomputer 26 activates the application for determining whether state is docked or undocked on the OS according to the signal input to the cradle microcomputer 26 from the photo interrupter 24. The cradle microcomputer 26 controls the ON and OFF of the SW switch 31a according to the result of determination by the application. The power supply to the dock connector 2 is cut off even when the SW switch 31a is turned OFF.

At this time, the cradle microcomputer 26 determines whether the state is docked or undocked using a firmware for the microcomputer, and the ON or OFF of the SW switch 31a is controlled according to the result of the determination. On the other hand, the ON or OFF of the HW switch 31b is immediately controlled by the input of the signal from the photo interrupter 24. Therefore, the HW switch 31b is turned OFF before the SW switch 31a is turned OFF.

In the present embodiment, with this mechanism, the ON and OFF of the HW switch 31b is HW controlled according to the locked or unlocked state of the lock mechanism 30 (that is, LOW or HIGH signal from the photo interrupter 24) before the determination whether the state is docked or undocked. In this way, the electric power is not supplied to the connection terminals 3a and 3b at the time of undocking after the unlocking. As a result, in the present embodiment, the spark occurring between the connection terminal and the contact point of the connection portion does not occur at the time of undocking. In this way, in the system of the tablet main body 10 and the cradle 20 in the present embodiment, the damage to the connection portion when disconnection the connection between the tablet main body 10 and the cradle 20 can be removed, and thus, it is possible to avoid the deterioration of the connection terminal.

Next, an example of the functional configuration of the tablet main body 10 and the cradle 20 in the present embodiment will be described referring to FIG. 6. The cradle 20 includes a connection portion 3, a control unit 260, a lock control unit 300, and an energization control unit 310.

The connection portion 3 is connected to a connection portion 4 of the tablet main body 10 to be electrically connected, and can communicate with and supply the electric power to the tablet main body 10. The function of the connection portion 3 is realized by, for example, the dock connector 2 and the connection terminals 3a and 3b.

The control unit 260 performs the control of the cradle 20. The control unit 260 determines a connected state (docked or undocked state) of the connection portion 3. The function of the control unit 260 is realized by, for example, the cradle microcomputer 26.

The lock control unit 300 determines the locked state (locked or unlocked state) of the tablet main body 10. The function of the lock control unit 300 is realized by, for example, the lock mechanism 30.

The lock control unit 300 detects a fact that the lock mechanism 30 is released, which locks the connection with the tablet main body 10. When the energization control unit 310 receives this detection result, the energization control unit 310 cuts off the energization to the connection portion 3. The function of the energization control unit 310 is realized by, for example, the switch mechanism 31.

The energization control unit 310 includes a first energization control unit 310a and a second energization control unit 310b. The first energization control unit 310a receives a detection result indicating that the lock mechanism 30 is released. Then, the first energization control unit 310a cuts off the energization to the connection portion 3 according to the result of determination of the connected state (docked or undocked state) of the connection portion 3 performed by the control unit 260.

The second energization control unit 310b cuts off the energization to the connection portion 3 regardless of the result of determination of the connected state of the connection portion 3 (that is, without performing the software processing). The function of the first energization control unit 310a is realized by, for example, the SW switch 31a. The function of the second energization control unit 310b is realized by, for example, the HW switch 31b.

The control unit 260 notifies a control unit 160 of the tablet main body 10 of the connected state via the connection portions 3 and 4. The function of the connection portion 4 is realized by, for example, the dock connector 1. The function of the control unit 160 is realized by, for example, the tablet microcomputer 16.

FIG. 6 is a block diagram focusing on the functions. Each unit focusing on the functions can be realized by only the hardware, by only the software, or by a combination of the hardware and the software.

Figure 7A:
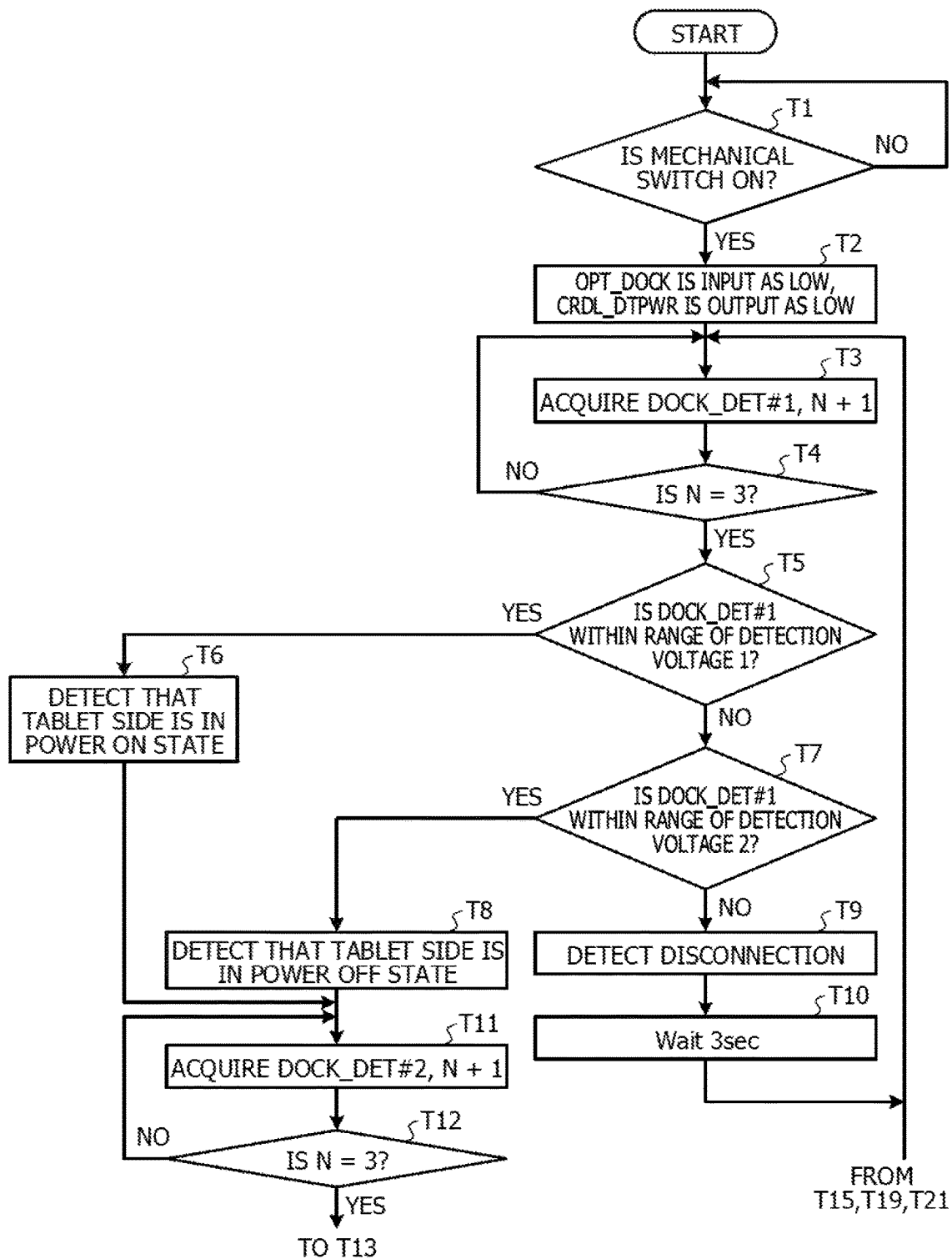

Next, an example of the connection state determination processing in the present embodiment will be described referring to FIG. 7A, FIG. 7B and FIG. 8. FIG. 7A, FIG. 7B and FIG. 8 are flowcharts illustrating an example of the determination processing for determining the connection state of the tablet main body 10 and the cradle 20 from the docked state to the undocked state.

The voltage value of the voltage acquired from one of the connection terminal 3b is illustrated as DOCK_DET#1. The voltage value of the voltage acquired from the other connection terminal 3b is illustrated as DOCK_DET#2. Hereinafter, a processing flow for detecting the connection state with the tablet main body 10 will be described referring to FIG. 7A, FIG. 7B and FIG. 8. The processing illustrated in FIG. 7A, FIG. 7B and FIG. 8 is performed by, for example, the cradle microcomputer 26.

In T1, the cradle microcomputer 26 determines whether or not the mechanical switch 22 is pressed. When the mechanical switch 22 is pressed, the hook 23 moves and the light shielding plate 23a is inserted into the photo interrupter 24, and the LED 24a and the phototransistor 24b of the photo interrupter 24 are cut off.

In T2, a value of an OPT_DOCK signal which is an output value of the photo interrupter is input to the cradle microcomputer 26. Here, the in a case where the light of the photo interrupter is shielded (locked), the OPT_DOCK signal is output as LOW, and in a case where the light of the photo interrupter is not shielded (unlocked), the OPT_DOCK signal is output as HIGH. When the OPT_DOCK signal is LOW, the HW switch 31b is turned ON. In a case where the output from the photo interrupter is LOW, since the tablet main body 10 is docked, the undocking processing illustrated in FIG. 9 is not performed.

In T2, when the OPT_DOCK signal LOW is input to the cradle microcomputer 26, a CRDL_DTPWR signal is output as LOW. The SW switch 31a is turned ON by the CRDL_DTPWR signal being LOW, and the electric power form the AC adapter is supplied to the dock connector 2.

In T3, the cradle microcomputer 26 acquires the voltage value acquired at the connection terminal 3*b* of the dock connector 2. The cradle microcomputer 26 converts the acquired voltage value to a digital signal using an analog/digital (A/D) conversion. The cradle microcomputer 26 acquires a DOCK_DET#1 which is a voltage value of the converted to the digital signal. The acquired DOCK_DET#1 is stored in, for example, the storage device of the cradle microcomputer 26. In T3, the cradle microcomputer 26 increments a variable number N used as a loop counter. An initial value of the variable number N is, for example, zero.

In T4, the cradle microcomputer 26 checks whether or not the value of the variable number N is three. In a case where the value of N is three, the process proceeds to T5. In a case where the value of N is not three, the process returns to T3 and the process in T3 is repeated. The loop from T3 to T4 is performed for avoiding an erroneous detection of the DOCK_DET#1 by the cradle microcomputer 26 due to an accidental reason such as a noise.

In T5, the cradle microcomputer 26 determines whether or not the DOCK_DET#1 acquired in T3 is within the range of the detection voltage 1. In a case where the DOCK_DET#1 is within the range of the detection voltage 1 (yes in T5), the process proceeds to T6. In a case where the DOCK_DET#1 is not within the range of the detection voltage 1 (no in T5), the process proceeds to T7.

In T6, due to the fact that the DOCK_DET#1 is within the range of the detection voltage 1, the cradle microcomputer 26 determines that the tablet main body 10 is in power ON state. Thereafter, the process proceeds to T11.

In T7, the cradle microcomputer 26 determines whether or not theDOCK_DET#1 is within a range of the detection voltage 2. In a case where the DOCK_DET#1 acquired in T3 is within the range of the detection voltage 2 (yes in T7), the process proceeds to T8. In a case where the DOCK_DET#1 is not within the range of the detection voltage 2 (no in T7), the process proceeds to T9.

In T8, due to the fact that the DOCK_DET#1 is not within the range of the detection voltage 1 and is within the detection voltage 2, the cradle microcomputer 26 determines that the tablet main body 10 is in power OFF state. Thereafter, the process proceeds to T11.

In T9, by the fact that the DOCK_DET#1 is within the range of the detection voltage 1 and is not within the range of the detection voltage 2, the cradle microcomputer 26 determines that the tablet main body 10 and the cradle 20 are not electrically connected to each other. In T10, the process returns to T3 after three second processing waiting time.

The processing items in T11 to T14, T17, T18, T20, and T21 are respectively similar to those in T3 to T10 except that the voltage value which is the target of the determination is changed to DOCK_DET#2 from the DOCK_DET#1, and thus, the description thereof will be omitted.

In T15, the DOCK_DET#1 acquired in T3 and the DOCK_DET#2 acquired in T11 are compared. In a case where the DOCK_DET#1 and the DOCK_DET#2 are equal to each other (yes in T15), the process proceeds to T16. In a case where the DOCK_DET#1 and the DOCK_DET#2 are different from each other (no in T15), the process returns to T3. In a case where the DOCK_DET#1 and the DOCK_DET#2 are equal to each other, it is determined that the tablet main body 10 and the cradle 20 are electrically connected to each other normally. In a case where the DOCK_DET#1 and the DOCK_DET#2 are equal to each other, it is determined that the electric power is supplied to the cradle 20 in both T6 and T14.

In the stage of T16, due to the processing in T15, it is checked that both the tablet main body 10 and the cradle 20 are in power ON state respectively. Therefore, in T16, for example, the electric power is supplied to the tablet main body 10 and the cradle 20 respectively connected to the AC adapter. Thereafter, in T22, the process proceeds to the processing illustrated in FIG. 8.

In the stage of T19, due to the processing in T18, it is detected that the tablet main body 10 is in power OFF state. Therefore, the electric power is supplied to the tablet main body 10 from the cradle 20.

The cradle microcomputer 26 determines whether or not the tablet main body 10 and the cradle 20 are electrically connected to each other by the processing in FIGS. 7A and 7B described above. Similarly, the tablet microcomputer 16 can also determine whether or not the tablet main body 10 and the cradle 20 are electrically connected to each other. The detection method by the tablet microcomputer 16 and the cradle microcomputer 26 are not limited to the method described above as long as the physical dock and undock can be detected. For example, the tablet microcomputer 16 and the cradle microcomputer 26 may detect the physically docked and undocked state using sensors such as the magnetic sensor 124.

Even in a case where the tablet main body 10 and the cradle 20 are electrically connected to each other, in some cases, the contact between the contact point of the tablet main body 10 and the connection terminals 3*a* and 3*b* of the cradle 20 is not sufficient. Even if it is connected well once, in some cases thereafter, the state is changed to an insufficient contact state. Therefore, subsequent to the processing in FIG. 7, the cradle microcomputer 26 performs the processing illustrated in FIG. 8.

FIG. 8 illustrates an example of determination processing for determining the insufficient contact between the contact point of the tablet main body 10 and the connection terminals of the cradle 20. The insufficient contact means the diagonal insertion of the tablet main body 10, that is, means that the tablet main body 10 is diagonally connected to the cradle 20. The insufficient contact includes a state in which the contact of one contact point among two connection terminals 3*b* is weaker than the contact of the other contact point.

In T101, the process is continued from T22 in FIG. 7. In T102, the tablet main body 10 is in a state of being placed on the cradle 20, that is, the docked state by the processing items in FIG. 7. In T103, the cradle microcomputer 26 sets a signal level of the CRDL_DTPWR signal as HIGH. The SW switch 31*a* is turned OFF by setting the signal level of the CRDL_DTPWR signal as HIGH. In this way, the power supply from the AC adapter to the cradle 20 becomes OFF.

In T104, the cradle microcomputer 26 acquires the DOCK_DET#1 and the DOCK_DET#2. Since the method of acquiring the voltage is same as that in T3 and T11 in FIG. 7, and the description thereof will be omitted. Since the processing in T105 is same as that in T4 and T12 in FIG. 7, and the description thereof will be omitted.

In T106, the cradle microcomputer 26 determines whether or not the DOCK_DET#1 and the DOCK_DET#2 acquired in T104 is lower than the range of the detection voltage 2. In a case where at least any one of the DOCK_DET#1 and the DOCK_DET#2 is lower the range of the detection voltage 2 (yes in T106), the process proceeds to T107. In a case where both the DOCK_DET#1 and the DOCK_DET#2 are equal to or higher than the range of the detection voltage 2 (no in T106), the process proceeds to T109.

In T107, due to the fact that at least one of the DOCK_DET#1 and the DOCK_DET#2 acquired in T104 is lower than the range of the detection voltage 2, the cradle microcomputer 26 detects increase of impedance of at least one of the connection terminals 3b. The cradle microcomputer 26 determines that the connection between the tablet main body 10 and the cradle 20 is defective due to the increase of impedance. For example, in some cases, a contact state between the contact point at the DOCK_DET#1 side and the connection terminal 3b (a first side) is more defective than a contact state between the contact point at the DOCK_DET#2 side and the connection terminal 3b (a second side). In this case where a contact resistance (impedance) at the first side is greater than a contact resistance (impedance) at the second side, and thus, it becomes difficult for the current to flow. Therefore, the voltage from the DOCK_DET#1 drops. When the voltage at this time departs from the voltage range indicating the normal connection, the cradle microcomputer 26 determines that the connection between the tablet main body 10 and the cradle 20 is insufficient.

In T108, the cradle microcomputer 26 turns the SW switch 31a OFF, and limits the functions such as the power supply and data communication between the tablet main body 10 and the cradle 20.

In T109, due to the fact that the both the DOCK_DET#1 and the DOCK_DET#2 acquired in T104 are equal to or higher than the range of the detection voltage 2, the cradle microcomputer 26 determines that the tablet main body 10 and the cradle 20 are normally connected to each other.

In T110, the cradle microcomputer 26 returns the signal level of the CRDL_DTPWR signal set HIGH in T103 to LOW. The power source is turned ON by returning the signal level of the CRDL_DTPWR signal to LOW. After 250 ms waiting time in T111, the cradle microcomputer 26 determines whether or not the tablet main body 10 is disconnected from the cradle 20 in T112. Subsequently, in T113, after 250 ms waiting time, the process proceeds to T103.

In the above description, the processing in FIG. 8 is performed by the cradle 20 with the signal level of the CRDL_DTPWR signal being HIGH. However, the processing in FIG. 8 may be performed by the tablet main body 10 or may be performed by both the tablet main body 10 and the cradle 20.

Next, an example of the undocking processing in the present embodiment will be described referring to FIG. 9. FIG. 9 is a flowchart illustrating an example of the undocking processing in the present embodiment. In the present embodiment, the electric power is supplied to the dock connector 2 from the AC adapter by turning ON a two-stage switch of the switch mechanism 31. In the present embodiment, at the time undocking, the energization to the dock connectors 1 and 2 is cut off before removing the tablet main body 10 from the cradle 20. In this way, it is possible to avoid the damage to the connection portion 3 that includes the dock connector 2 and the connection terminals 3a and 3b. The undocking processing in the present embodiment is performed by the cradle microcomputer 26.

First, in 51, the cradle microcomputer 26 monitors the current connection state and determines whether or not the tablet main body 10 is in the docked state. As illustrated in FIG. 7, the cradle microcomputer 26 determines the current connection state based on the result of comparison between the acquired voltage values of the detection voltages 1 and 2.

In a case where it is determined that the tablet main body 10 is in the undocked state, the present process ends. On the other hand, in a case where it is determined that the tablet main body 10 is in the docked state, the process proceeds to S2. In S2, the cradle microcomputer 26 acquires the value of the OPT_DOCK signal which is the output value of the photo interrupter 24. Here, the OPT_DOCK signal is output as LOW in a case where the light of the photo interrupter 24 is shielded (locked), and is output as HIGH in a case where the light is not shielded (unlocked).

In S3, the cradle microcomputer 26 determines whether or not the output value of the photo interrupter 24 is HIGH. In a case where the output of the photo interrupter 24 is LOW, the cradle microcomputer 26 determines that the tablet main body 10 is locked. Therefore, the cradle microcomputer 26 estimates that the state is docked state, and the process returns to S2. In this way, when the tablet main body 10 is in the docked state, the undocking processing is not performed.

Figure 10:
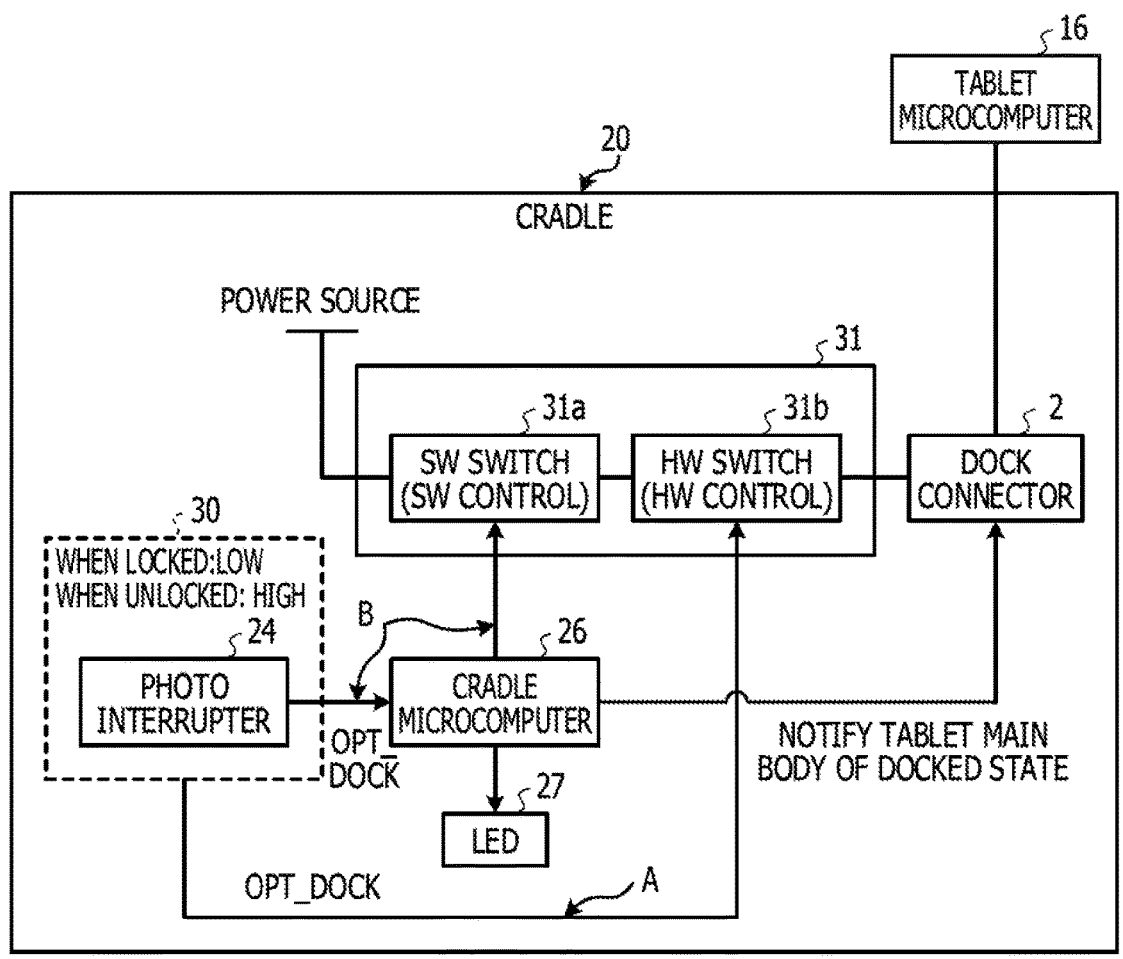
FIG. 10 is a diagram illustrating an example of a switching control in the embodiment.

Here, when the user presses the eject button 21, the hook 23 of the cradle 20 slides and the output (OPT_DOCK#) of the photo interrupter 24 becomes HIGH. As illustrated in FIG. 10, the OPT_DOCK signal is input to the cradle microcomputer 26 and the HW switch 31b of the switch mechanism 31 supplied to the tablet main body 10 side from the cradle 20. When the OPT_DOCK signal is changed to HIGH from LOW, in S4 in FIG. 9, the HW switch 31b is instantaneously turned OFF and the power source line is cut, and thus, the electric power supply to the dock connector 2 is stopped. Since the processing in S4 is a HW control, the HW switch 31b is turned OFF before the SW switch 31a is turned OFF by the SW control performed by the cradle microcomputer 26. Therefore, in the present embodiment, before the tablet main body 10 is removed (undocked) from the cradle 20, it is possible to cut off the power supply to the dock connector 2. The processing in S4 is a HW control using a line indicated by A in FIG. 10. The processing in S4 is an example of a control by a second energize control unit that cuts off the energization to the dock connector 2 regardless of the result of determination of the connected state of the dock connector 2.

On the other hand, when the OPT_DOCK signal is changed to HIGH, in S5, the SW switch 31a of the switch mechanism 31 is turned OFF by the SW control by the cradle microcomputer 26. At the time when the OPT_DOCK signal is changed to HIGH, the cradle microcomputer 26 controls the SW switch 31a so as be turned OFF. The processing in S5 is a control using a line indicated by B in FIG. 10. The processing in S5 is an example of a control by a first energize control unit that cuts off the energization to the dock connector 2 according to the result of determination of the connected state of the dock connector 2 performed by the cradle microcomputer 26.

In S6, the cradle microcomputer 26 notifies the tablet microcomputer 16 of the undocked state, and turns off the LED 27 at the cradle side. The user can visually recognize that the tablet main body 10 and the cradle 20 are not correctly connected to each other by the LED 27 being turned off.

Since the power supply can be cut off when the switch mechanism 31 is turned OFF by the HW control in the processing in S4, it can be considered that the processing in S5 may not be performed. However, it is desirable that the processing in S5 be performed together with the processing in S4. The reason is as follows. If the processing in S5 is omitted and the SW switch 31a continues to be in ON state, when trying to reconnect the tablet main body 10 to the cradle after the removal, if the HW switch 31b is controlled to be turned ON from OFF, the power supply may be started. However, at the time of reconnection, it is desirable that the cradle microcomputer 26 monitors the connection state and starts the energization after checking the complete docking. Therefore, at the time of undocking, the SW switch 31a is turned OFF by the processing in S5.

As described above, according to the system in the present embodiment, at the time of unlocking before the SW switch 31a is turned OFF, the HW switch 31b is turned OFF. Therefore, at the time when the SW switch 31a is turn OFF (that is, at the time of undocking), the energization to the dock connector 2 is already cut off. Accordingly, it becomes possible to remove the tablet main body 10 from the cradle 20 in a state in which the power supply to the connection terminals 3a and 3b is cut off, and thus, it is possible to avoid the deterioration or a corrosion of the connection terminal and to extend the product life. Even when the user does not activates the tablet main body 10, the user can simply recognize the docked state trough the LED 27, and additionally, even in a state of incomplete docking, the user can be notified of such a state. Therefore, the user can use the tablet main body 10 and the cradle 20 in the state of complete docking.

At the time docking, firstly, the HW switch 31b is controlled to be turned ON by the photo interrupter 24. Furthermore, the cradle microcomputer 26 monitors the voltage range between the connection terminals 3b at both ends. The cradle microcomputer 26 starts the energization when the SW switch 31a is turned ON after checking the normal voltage value. At the time docking, since the energization is started after the complete docking, it is possible to avoid the sparks and electrolytic corrosion in the connection terminal.

At the time undocking, both the SW switch 31a and the HW switch 31b are finally turned OFF by the processing items in S4 and S5 in FIG. 9. However, at that time in S4, the HW switch 31b is cut off firstly due to the output of the photo interrupter 24. Therefore, it is possible to cut off the energization to the dock connector 2 at the unlocking time point. Furthermore, the undocking notification issued by the cradle microcomputer 26 is received by the tablet microcomputer 16, all the voltages supplied to the dock connectors 1 and 2 are cut off. In this way, it is possible to remove the tablet main body 10 and the cradle 20 from each other without sparking. As a result, it is possible to avoid the deterioration of the connection terminals.

In a cradle in the related art, even if the dock connector is in contact, the microcomputer determines the state is the docked state. At the cradle side, there is no way for the user to simply recognize the docked state. Therefore, in a case of the state in which the hook of the cradle is not completely locked and the dock connectors can be in contact with other, in some cases, the user can use the tablet main body 10 and the cradle 20 even in the state of incomplete docking. Therefore, the tablet main body is removed from the cradle in an unintended situation.

On the contrary, the cradle 20 in the present embodiment has a function of detecting the sliding position of the hook 23 using the photo interrupter 24. In this way, for example, in a state in which the hook 23 is in half-locked state (for example, a state in which the hook 23 slides only half the degree than that in a completely locked state), the photo interrupter 24 outputs HIGH. Therefore, cradle microcomputer 26 can determine the state as the unlocked state. In this way, the user can use the tablet main body 10 in the state of complete locking, and it is possible to avoid the tablet main body 10 from being removed from the cradle 20 in the unintended situation.

The control of the switch mechanism 31 at the time of supplying the electric power to the cradle 20 is described in FIG. 10. However, in the system of the tablet main body 10 and the cradle 20 in the present embodiment, not limited to a case where the power source system is at the cradle 20 side, the power source system may be at the tablet main body 10 side as illustrated in FIG. 11.

Figure 11:
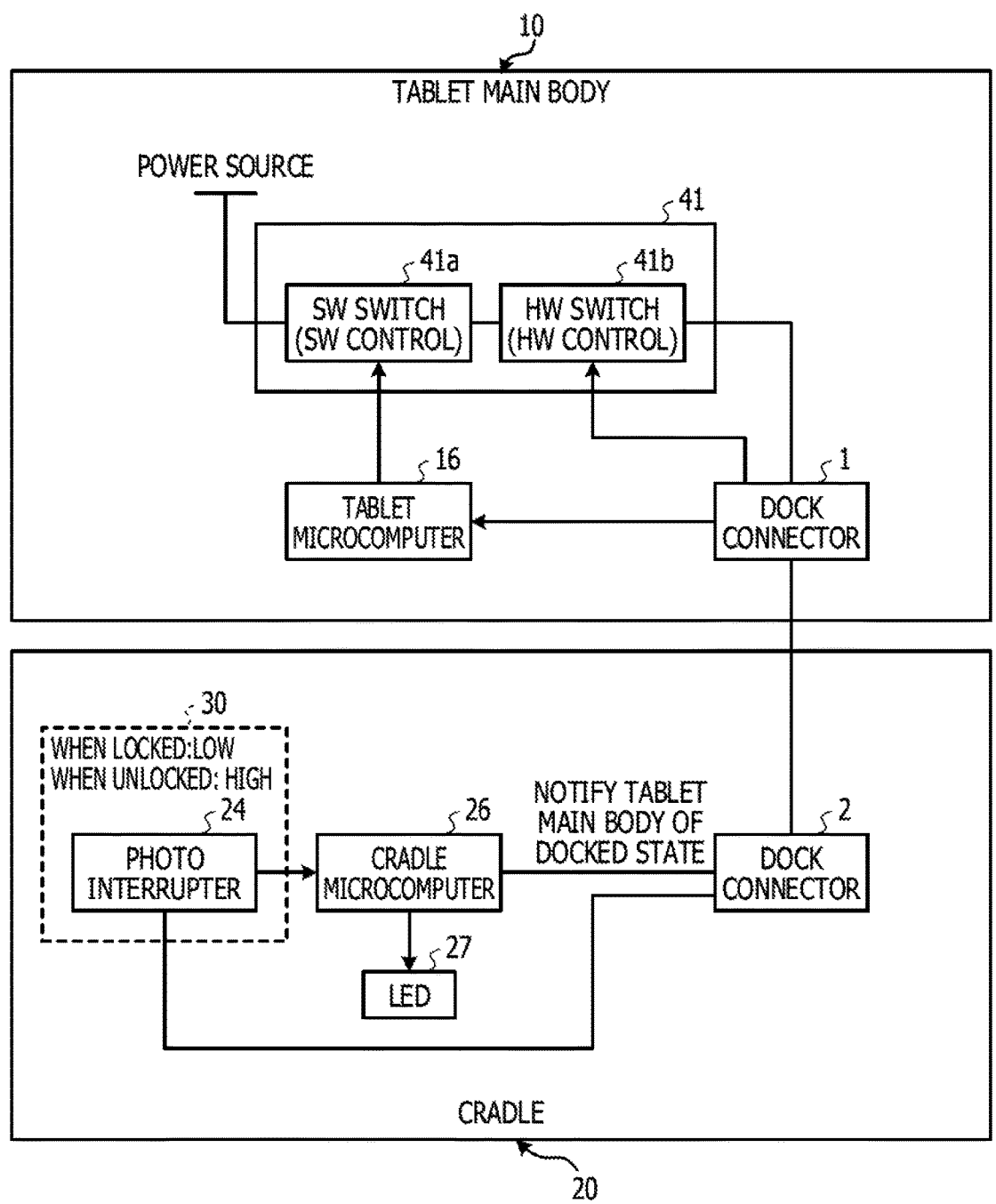
FIG. 11 is a diagram illustrating another example of the switching control in the embodiment.

FIG. 11 illustrates a switching control flow in a case where the electric power is supplied to the cradle 20 from the tablet main body 10. At this time, a switch mechanism 41 is at the tablet main body 10 side. The lock mechanism 30 is at the cradle 20 side.

In this case, when the OPT_DOCK signal output from the photo interrupter 24 becomes HIGH, the control of the HW switch 41b (HW control) makes the HW switch 41b be turned OFF through the dock connectors 1 and 2. In this way, it is possible to instantaneously cut off the energization to the dock connectors 1 and 2.

T control of the SW switch 41a (SW control) is performed by the cradle microcomputer 26 notifying the tablet microcomputer 16 of the undocked state, and the tablet microcomputer 16 cutting off the SW switch 41a. In this way, in any case of the power supply from the tablet main body 10 side or the power supply from the cradle 20 side, it is possible to cut off the energization to the dock connectors 1 and 2 before the tablet main body 10 and the cradle 20 are separated from each other.

Figure 12:
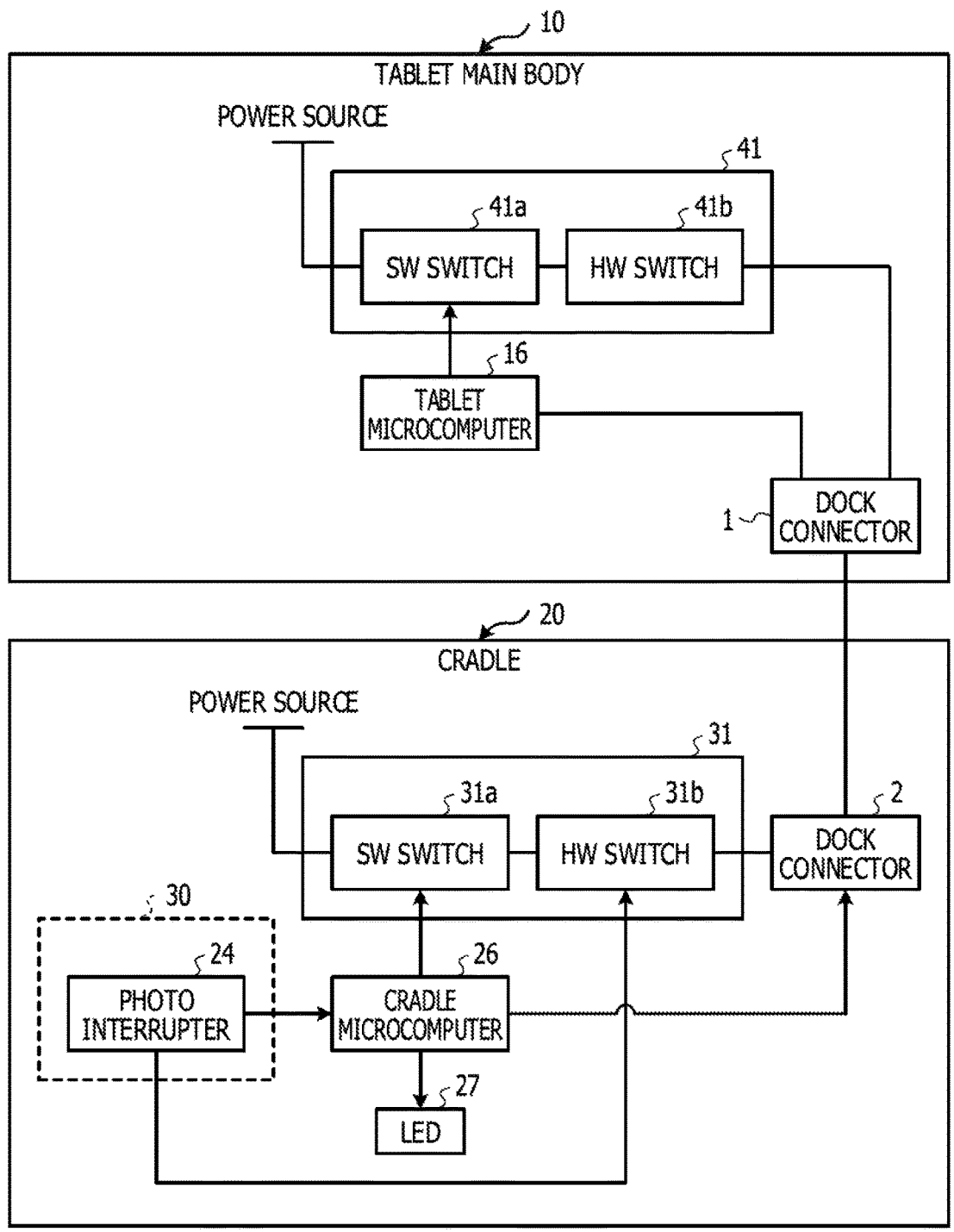
FIG. 12 is a diagram illustrating another example of the switching control in the embodiment.

Furthermore, in a case of the power supply from both the tablet main body 10 side and the cradle 20 side also, it is possible to cut off the energization to the dock connectors 1 and 2 before the tablet main body 10 and the cradle 20 are separated from each other. FIG. 12 illustrates a switching control flow in a case where the tablet main body 10 and the cradle 20 supply the electric power. At this time, both the switch mechanisms 31 and 41 are at the tablet main body 10 side and the cradle 20 side, and the lock mechanism 30 is at the cradle 20 side.

In this case, when the OPT_DOCK signal output from the photo interrupter 24 becomes HIGH, the HW switch 31b and the HW switch 41b are turned OFF. In this way, the energization to the dock connector 2 is cut off. Accordingly, it is possible to instantaneously cut off the energization to the dock connectors 1 and 2.

The control of the SW switch 31a (SW control) is performed by the cradle microcomputer 26 cutting off the SW switch 31a and the tablet microcomputer cutting off the SW switch 41a when the OPT_DOCK signal output from the photo interrupter 24 becomes HIGH. In this way, it is possible to cut off the energization to the dock connectors 1 and 2 before tablet main body 10 and the cradle 20 are separated from each other.

As above, the terminal device, the system, and the program in the above embodiment are described. However, the terminal device, the system, and the program in the present disclosure are not limited to the embodiment described above, and various modifications and improvements can be made within the scope of the present disclosure. In a case where a plurality of above-described embodiments and the modification examples are present, those can be combined within the range of no conflict.

For example, the configuration of the system in the embodiment described above is an example, and does not limit the scope of the present disclosure. Of course, there may be various system configuration examples depending on the usage and purpose. For example, the system configuration in which the tablet main body 10 and the cradle are connected to each other is one aspect of the system in the present embodiment, and is not limited thereto.

Figure 13A:
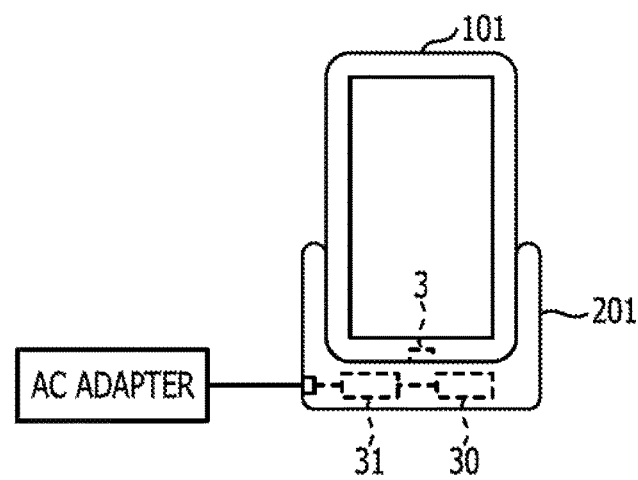
FIGS. 13A to 13C are diagrams illustrating a modification example of the system in the embodiment.

The system in the present embodiment may be any system as long as one terminal device and another terminal device can be connected via a connection portion. For example, as illustrated in FIG. 13A, a mobile terminal 101 such as a smart phone and a battery charger 201 may be electrically connected to each other via the connection portion 3. For example, when the OPT_DOCK signal output from the lock mechanism 30 becomes HIGH by pressing the eject button, the HW switch of the switch mechanism 31 is turned OFF. In this way, the power supply to the connection portion 3 from the AC adapter is cut off. On the other hand, when the OPT_DOCK signal output from the lock mechanism 30 becomes HIGH, the SW switch of the switch mechanism 31 is turned OFF by a control by the microcomputer at the battery charger 201 side. In this way, the HW switch is turned OFF before the mobile terminal 101 is removed from the battery charger 201. As a result, when the mobile terminal 101 is removed from the battery charger 201, since the energization to the connection portion 3 is in a state of being cut off, the spark does not occur, and thus, it is possible to avoid the deterioration of the connection terminals of the connection portion 3. By providing the switch mechanism 31 and the power source system at the mobile terminal 101, the supply or cutoff of the electric power from the AC adapter may be performed at the mobile terminal 101 side.

Figure 13B:
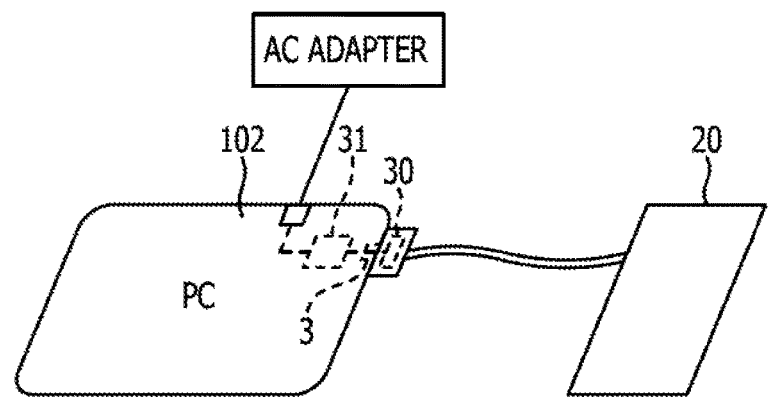

As illustrated in FIG. 13B, a PC 102 and the cradle 20 may be electrically connected via a cable. The lock mechanism 30 is provided at the distal end portion of the cable. When the OPT_DOCK signal output from the lock mechanism 30 HIGH by pressing the eject button becomes, the HW switch of the switch mechanism 31 in the PC 102 is turned OFF. In this way, the power supply to the connection portion 3 from the AC adapter is cut off. When the PC 102 is removed from the cradle 20, since the energization to the connection portion 3 is in a state of being cut off, the spark does not occur, and thus, it is possible to avoid the deterioration of the connection terminals of the connection portion 3.

Figure 13C:
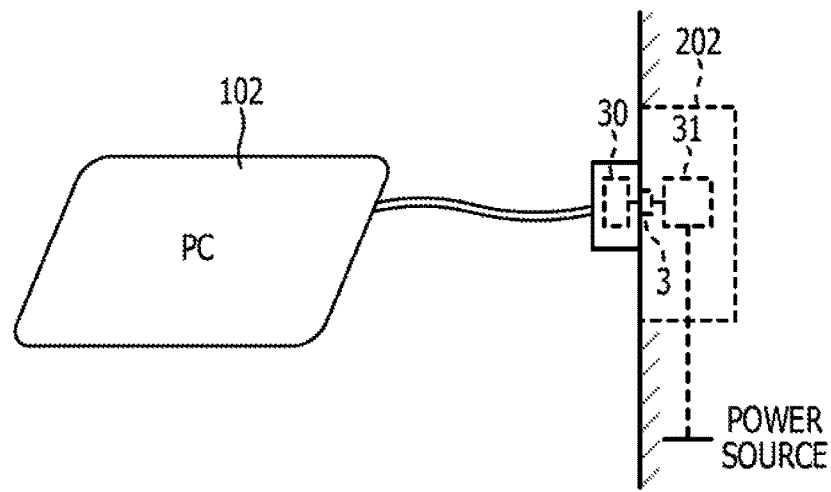

As illustrated in FIG. 13C, the PC 102 and a fixed member 202 embedded in a wall may be electrically connected via a cable. The lock mechanism 30 is provided at the distal end portion of the cable. When the OPT_DOCK signal output from the lock mechanism 30 becomes HIGH by pressing the eject button, the HW switch of the switch mechanism 31 in the fixed member 202 is turned OFF. When the PC 102 is removed from the fixed member 202, the since the energization to the connection portion 3 is in a state of being cut off. Therefore, the spark does not occur, and thus, it is possible to avoid the deterioration of the connection terminals of the connection portion 3.

The tablet main body 10 and the cradle 20 described above may be any of one terminal device or the other terminal device configuring the system in which those terminals can be connected to each other via the connection portion such as the dock connectors. That is, the tablet main body 10 includes a connection portion, and is an example of a terminal device that cuts off the energization to the connection portion when receiving the detection that releasing operation is started before the lock mechanism locking the connection to the other terminal device is released. In this case, the cradle 20 is an example of the other terminal device connected to the terminal device.

The cradle 20 includes the connection portion, and is an example of a terminal device that cuts off the energization to the connection portion when receiving the detection that releasing operation is started before the lock mechanism locking the connection to the other terminal device is released. In this case, the tablet main body 10 is an example of the other terminal device connected to the terminal device.

Similarly, the mobile terminal 101, the battery charger 201, the PC 102, and the fixed member 202 illustrated in FIGS. 13A to 13C are examples of terminal devices that cut off the energization to the connection portion when receiving the detection that releasing operation is started before the lock mechanism locking the connection to the other terminal device is released.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An information processing device, comprising:
a plate on which a hook is provided and configured to move between a first position where a connection with another information processing device by the hook is done and a second position where the connection by the hook is released; and
a processor configured to:
energize the another information processing device via a connection terminal when the connection is maintained by the hook,
receive information indicating that a releasing operation for releasing the connection is started before the connection is released when a position of the plate is moved, and
cut off the energization to the another information processing device via the connection terminal according to the reception,
wherein the processor includes:
a first processor configured to cut off the energization based on a result of processing by software that determines a state of the connection, and
a second processor configured to cut off the energization without the processing by the software.
2. The information processing device according to claim 1,
a sensor configured to detect that the releasing operation is started before the connection is released when the position of the plate is moved.
3. The information processing device according to claim 2,
wherein the sensor is a photo interrupter configured to include a light emitting diode and a light receiving diode, and
the photo interrupter detects that the releasing operation is started based on a state in which the light receiving diode detects that a light from the light emitting diode is shielded due to a movement of the position of the plate.

4. The information processing device according to claim 2,
wherein the sensor is a magnetic sensor configured to detect a magnetic field, and
the magnetic sensor determines that releasing operation is started when a magnitude of the detected magnetic field is greater than a predetermined value.

5. The information processing device according to claim 2,
wherein the sensor is a switch, and
the switch detects that the releasing operation is started by detecting that the switch is turned ON from OFF due to a movement of the position of the plate.

6. The information processing device according to claim 1,
wherein the information processing device is a cradle and the another information processing device is a tablet.

7. A control method executed by a processor included in an information processing device, the information processing device including a plate on which a hook is provided and configured to move between a first position where a connection with another information processing device by the hook is done and a second position where the connection by the hook is released, the control method comprising:
energizing the another information processing device via a connection terminal when the connection is maintained by the hook,
receiving information indicating that a releasing operation for releasing the connection is started before the connection is released when a position of the plate is moved, and
cutting off the energization to the another information processing device via the connection terminal according to the reception,
wherein the processor includes:
a first processor configured to cut off the energization based on a result of processing by software that determines a state of the connection, and
a second processor configured to cut off the energization without the processing by the software.

8. A non-transitory computer-readable storage medium storing a program that causes a processor included in an information processing device to execute a process, the information processing device including a plate on which a hook is provided and configured to move between a first position where a connection with another information processing device by the hook is done and a second position where the connection by the hook is released, the process comprising:
energizing the another information processing device via a connection terminal when the connection is maintained by the hook,
receiving information indicating that a releasing operation for releasing the connection is started before the connection is released when a position of the plate is moved, and
cutting off the energization to the another information processing device via the connection terminal according to the reception,
wherein the processor includes:
a first processor configured to cut off the energization based on a result of processing by software that determines a state of the connection, and
a second processor configured to cut off the energization without the processing by the software.

* * * * *